Dec. 29, 1925.

J. C. POTTER

RING SPINNING MACHINE

Filed Oct. 11, 1922

1,567,382

Inventor
JAMES C. POTTER,
By Theo. J. Williamson
Attorney

Patented Dec. 29, 1925.

1,567,382

UNITED STATES PATENT OFFICE.

JAMES C. POTTER, OF PAWTUCKET, RHODE ISLAND.

RING-SPINNING MACHINE.

Application filed October 11, 1922. Serial No. 593,818.

*To all whom it may concern:*

Be it known that I, JAMES C. POTTER, residing at Pawtucket, Rhode Island, a citizen of the United States, have invented certain new and useful Improvements in Ring-Spinning Machines, of which the following is a specification.

My invention relates to ring spinning or twisting machines in which the rings are stationarily supported and the spindles are traversed through the ring, as in my United States Patent No. 1,401,729 issued December 27, 1921, and in which the tin roller or spindle drive moves vertically with the spindles so that the spindle driven belts or bands may be maintained at the proper driving tension at all points in the vertical travel of the spindles. One of the problems presented in such a machine is to transmit driving power from a relatively stationary shaft or motor to the vertically movable tin roller. In my said patent I solve that problem by a special arrangement of band drive between the driving pulley on a counter shaft and a pulley on the tin roller which included a belt tightening device. The object of my present invention is to provide simpler and yet highly efficient means for transmitting driving power from a stationary shaft or motor to a vertically movable tin roller. My invention consists in whatever is described by or included within the scope or meaning of the appended claims.

Figure 1:
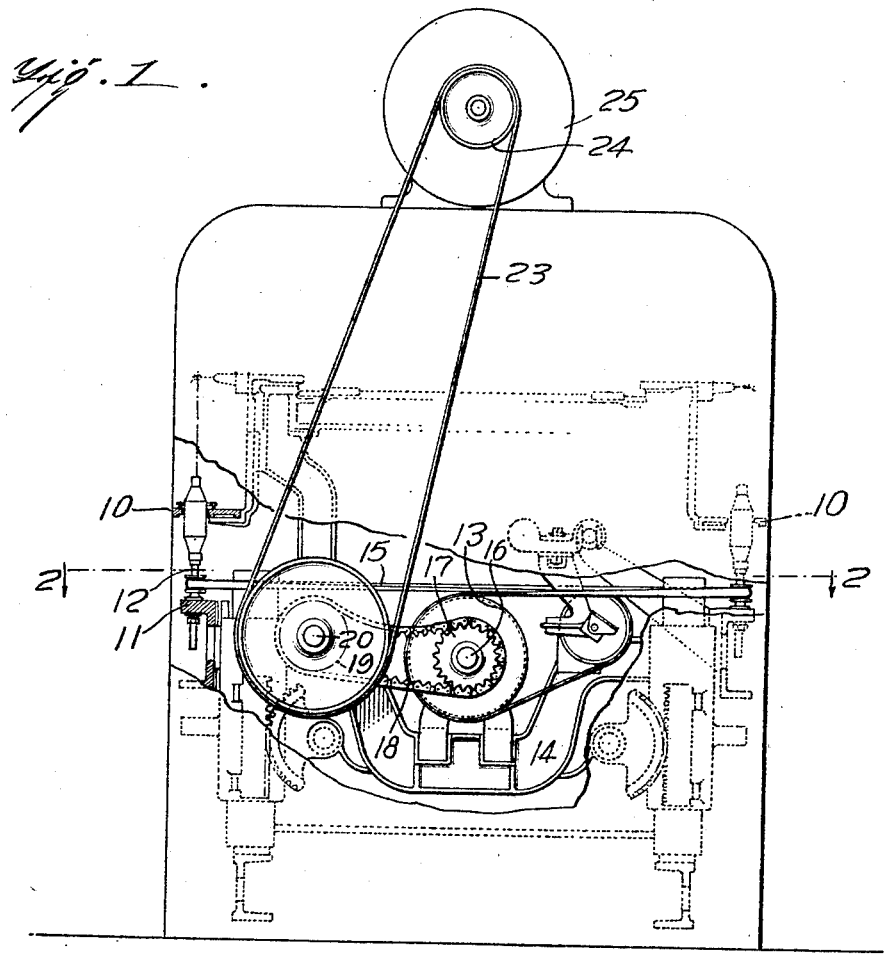
Figure 1 is an end elevation of a ring spinning machine embodying my invention.
Figure 2:
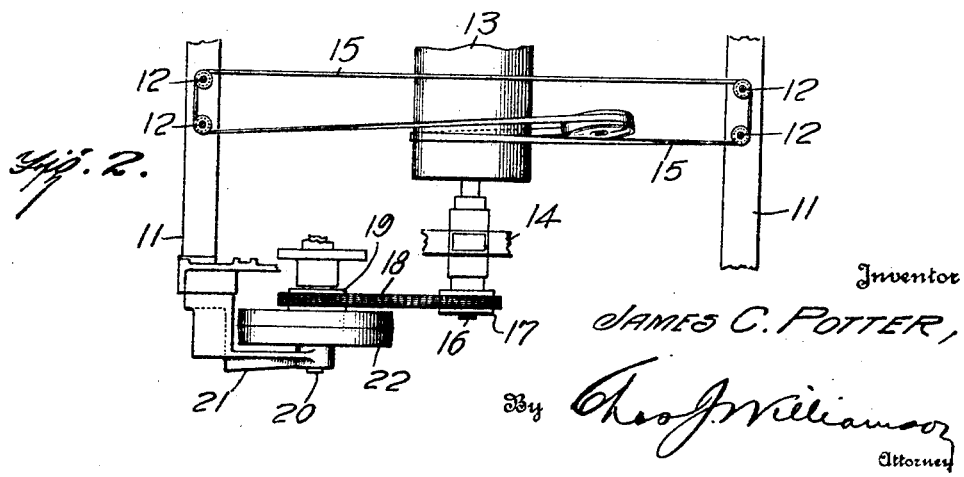
Fig. 2 is a horizontal section on the line 2—2 of Fig. 1.

Referring in detail to what is shown in the drawings the stationary ring rails, 10, and the rings and travelers thereon and the rails, 11, which support the spindles, 12, and the builder motion by which the traverse of the spindle rails is effected may be the same as in my above mentioned patent or of any other construction or arrangement. The tin roller, 13, is mounted in bearings upon cross-bars, 14, which extend between and are secured to the spindle rails, 11, on opposite sides of the machine so that tin roller, spindles and the belts or bands, 15, which transmit power from the tin roller to the spindle all move up and down together. Upon the end of the tin roller shaft, 16, outside the adjacent cross-bar 14, is fixed a sprocket wheel, 17, which by a sprocket chain, 18, of the silent type is connected to a sprocket wheel, 19, on a jack shaft, 20, supported in suitable bearings one of which is a bracket, 21, bolted to the machine headstock so that the shaft, 20, and the sprocket wheel thereon are stationarily supported. Upon the shaft, 20, is a pulley, 22, which by a belt, 23, is connected with a driving pulley, 24, of an electric motor, 25, mounted on the top of the headstock.

The length of the sprocket chain, 18, is such that from a neutral or mid-position which is one where the centers of the driving sprocket wheel, 19, and the driven sprocket wheel, 17, are in the same horizontal plane, the tin roller may move up three or four inches or down three or four inches so that its total traverse is from six to eight inches, or the amount of vertical traverse of the spindles through the rings. It will thus be seen that by the described mounting of the driving and driven wheels, 19 and 16, and the flexible power transmitting belt or band connection between them, the necessary vertical movement of the tin roller can be secured while maintaining an efficient driving connection at all times with the stationary driving shaft or motor without the employment of any belt tightener, the result being an exceedingly simple and highly efficient construction.

My invention is applicable to twisting machines as well as spinning machines, and when I use the terms "spinning" in the claims it is to be understood as including twisting machines.

What I claim is:

1. In a ring spinning machine having stationarily supported rings and traversing spindles the combination of spindle rotating means comprising a rotatable member belted to the spindles and mounted for movement with the spindles when the latter traverse through the rings, a stationarily supported rotating power transmitting element, a rotatable power receiving element for rotating the rotatable spindle driving member and partaking of the movement of the latter during the traverse of the spindles, and a single flexible power transmitting means extending directly between said driving and driven elements.

2. In a ring spinning machine having stationarily supported rings and traversing spindles the combination of spindle rotating means comprising a rotatable member belted to the spindles and mounted for movement with the spindles when the latter traverse through the rings, a stationarily supported rotating power transmitting element, a rotatable power receiving element for rotating the rotatable spindle driving member and partaking of the movement of the latter during the traverse of the spindles, and a flexible power transmitting means between said driving and driven elements, the axis of said driving and driven elements when nearest together being intermediate the limits of motion of the driven element during the traverse of the spindles.

3. In a spinning machine having stationarily supported rings and traversing spindles the combination of spindle rotating means comprising a tin roller belted to and mounted for movement with the spindles, a stationarily supported driving wheel, a driven wheel connected with and partaking of the traversing movement of the tin roller and a single flexible connection extending directly between said wheels.

4. In a spinning machine having stationarily supported rings and traversing spindles, the combination of spindle rotating means comprising a tin roller belted to and mounted for movement with the spindles, a stationarily supported driving wheel, a driven wheel connected with and partaking of the traversing movement of the tin roller and a flexible connection between said wheels, the point in the traversing movement of the driven wheel when it is nearest the driving wheel being between the limits of traversing movement of said driven wheel.

5. In a spinning machine having stationarily supported rings and traversing spindles, the combination of spindle rotating mean comprising a tin roller, spindle supporting rails, cross-bars connecting such rails and moving therewith, a tin roller mounted in bearings on such rails, a sprocket wheel on the tin roller shaft, a stationarily supported sprocket wheel, a chain connecting the two sprocket wheels, and a stationarily supported driving pulley for the stationarily supported sprocket wheel.

6. In a spinning machine having stationarily supported rings and traversing spindles, the combination of spindle rotating means comprising a tin roller, spindle supporting rails, cross-bars connecting such rails and moving therewith, a tin roller mounted in bearings on such rails, a sprocket wheel on the tin roller shaft, a stationarily supported sprocket wheel, a chain connecting the two sprocket wheels and a stationarily supported driving pulley for the stationarily supported sprocket wheel, the point when the two sprocket wheels are nearest together being between the limits of traversing movement of the tin roller.

In testimony whereof I hereunto affix my signature.

JAMES C. POTTER.